(12) United States Patent
Dewar et al.

(10) Patent No.: US 8,201,095 B2
(45) Date of Patent: Jun. 12, 2012

(54) SYSTEM AND METHOD FOR PROVIDING AN OPTION TO AUTO-GENERATE A THREAD ON A WEB FORUM IN RESPONSE TO A CHANGE IN TOPIC

(75) Inventors: Ami H. Dewar, Durham, NC (US);
Robert C. Leah, Cary, NC (US);
Nicholas E. Poore, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/417,238

(22) Filed: Apr. 2, 2009

(65) Prior Publication Data

US 2010/0257186 A1 Oct. 7, 2010

(51) Int. Cl.
*G06F 3/048* (2006.01)
*G06F 3/00* (2006.01)

(52) U.S. Cl. ........ 715/759; 715/736; 715/744; 715/753; 715/758

(58) Field of Classification Search .................. 715/733, 715/736, 738, 744, 745, 753, 758, 759
See application file for complete search history.

(56) References Cited

U.S. PATENT DOCUMENTS

| 2003/0158855 | A1* | 8/2003 | Farnham et al. | 707/102 |
| 2004/0054670 | A1* | 3/2004 | Noff et al. | 707/3 |
| 2007/0255791 | A1* | 11/2007 | Bodlaender et al. | 709/206 |
| 2008/0082607 | A1* | 4/2008 | Sastry et al. | 709/204 |
| 2008/0244438 | A1* | 10/2008 | Peters et al. | 715/772 |

* cited by examiner

*Primary Examiner* — Nicholas Augustine
(74) *Attorney, Agent, or Firm* — Jeffrey T. Holman

(57) ABSTRACT

Methods and systems for providing an option to auto-generate a thread on a web forum in response to a change in topic are described. When a post is received on a thread in the web forum, wherein the thread includes one or more thread keywords and wherein each of the one or more thread keywords are associated with a relevancy score, the post is searched for the one or more thread keywords. The relevancy scores of any of the one or more thread keywords located within the post are added together to obtain a post total relevancy score. A query is then provided, to a user, for example, to auto-generate a new thread on the web forum when the post total relevancy score is less than a threshold relevancy score.

21 Claims, 5 Drawing Sheets

SYSTEM AND METHOD FOR PROVIDING AN OPTION TO AUTO-GENERATE A THREAD ON A WEB FORUM IN RESPONSE TO A CHANGE IN TOPIC

BACKGROUND OF THE INVENTION

Web forums can be web applications used for holding discussions and posting user-generated content. In some web sites, web forums can account for more than 50% of the total site traffic. The user-generated content ("posts") can take the form of textual messages, videos, sound files, or web links, for example. Posts can be topically grouped into topic threads ("threads"), which in turn can be organized into a hierarchy (e.g., based upon the time the message is posted, or based upon subtopics). Threads can be used, for example, to address questions users have about the website, technical difficulties confronting a user, and/or to socialize on any variety of subjects.

In conventional web forums, there generally is no methodology behind the creation of threads. Threads can be created by either a moderator or a member of the forum, and can relate to any topic the creator chooses. True to human nature, however, threads can easily be diverted from the original topic or topics, and as a result can become off-topic. Diverted threads can lead to unorganized, cluttered forums, with unanswered questions, responses that are irrelevant to the threads that they are situated within, and situations where the user is required to browse through a large number of posts within a thread to locate relevant subject material. Forum clutter can generally lead to inadequate community response to questions or problems, failure to resolve these issues, and reduced visibility and/or participation in threads. Because useful forum content can be crucial to forum participation, forum clutter can inhibit the effectiveness of a web forum. Furthermore, off-topic posts can take up the moderator's time and resources, because the off-topic posts must be manually moved to other threads in conventional web forums. Off-topic posts may also lead to thread "shoutdown," where other users make posts directing the creator of the off-topic post to the correct thread. This can cause additional thread clutter.

BRIEF SUMMARY OF THE INVENTION

Methods and systems for providing an option to auto-generate a thread on a web forum in response to a change in topic are described. When a post is received on a thread in the web forum, wherein the thread includes one or more thread keywords and wherein each of the one or more thread keywords are associated with a relevancy score, the post is searched for the one or more thread keywords. The relevancy scores of any of the one or more thread keywords located within the post are added together to obtain a post total relevancy score. A query is then provided, to a user, for example, to auto-generate a new thread on the web forum when the post total relevancy score is less than a threshold relevancy score.

DETAILED DESCRIPTION OF THE INVENTION

Processes, systems, and computer readable media for providing an option to auto-generate a thread on a web forum in response to a change in topic are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

As stated above, a thread may become cluttered if subsequent posts diverge substantially from the original topic or topics from the original post (i.e., the subsequent posts ask questions about other subject matter, or cause a shift in the discussion of the thread to another topic). In order to help prevent inadvertent clutter of threads, it is determined whether or not a subsequent post in a thread contains enough keywords to meet a relevancy threshold score. If the subsequent post does not meet the relevancy threshold score, then a query is presented to the user submitting the subsequent post requesting if the user would prefer to have a new thread automatically generated ("auto-generated") rather than have a post that is seemingly related to a different topic than the original post. Auto-generation refers to generation of the thread without requiring a forum member or moderator to create the thread. By providing the option to create an auto-generated thread for a user's post before the user makes an off-topic post in the thread, thread clutter may be avoided and the web forum may enjoy superior and more specific organization.

Figure 1:
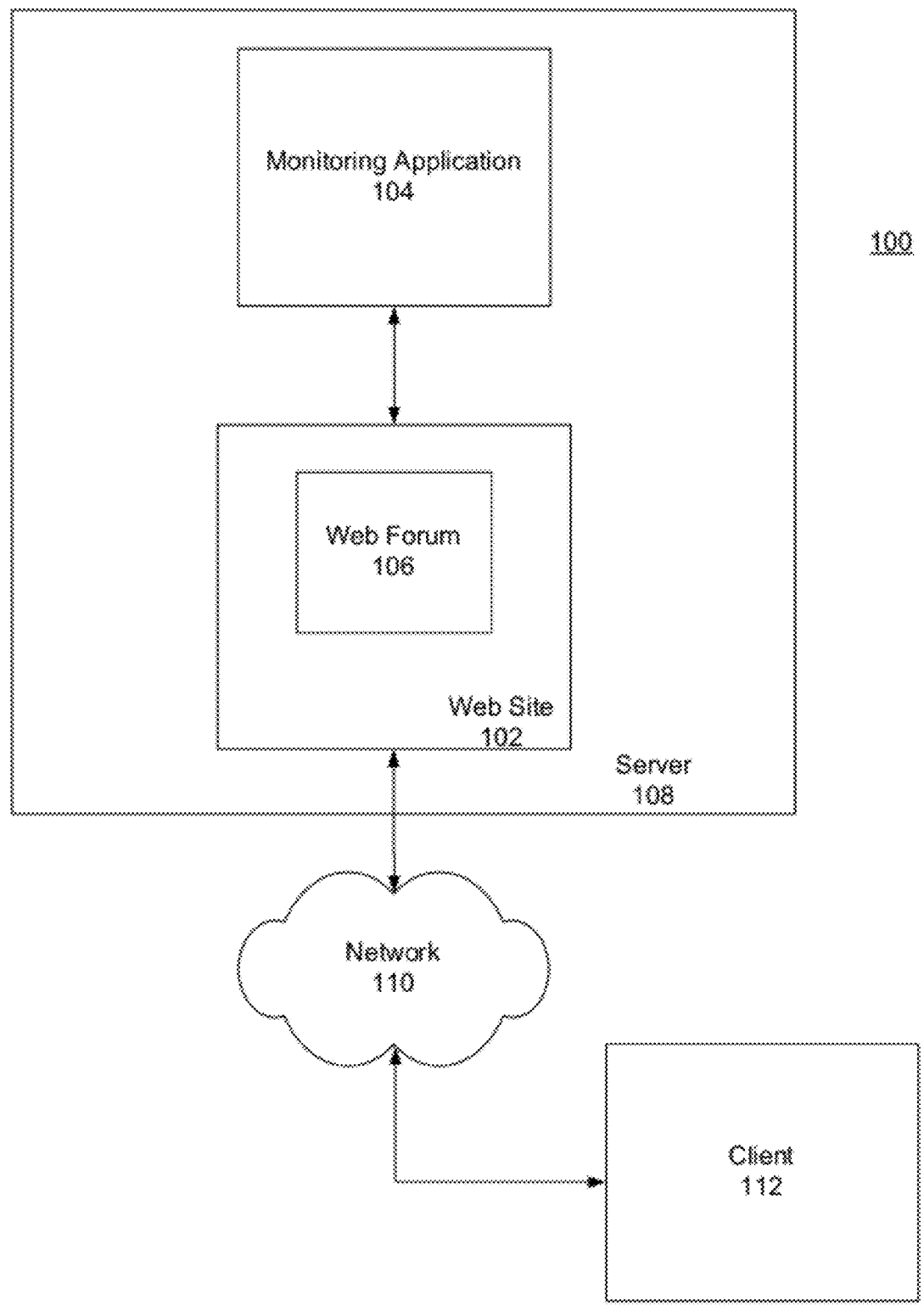
FIG. 1 illustrates an exemplary embodiment of a system for providing an option to auto-generate a thread on a web forum in response to a change in topic.

FIG. 1 illustrates an exemplary embodiment of a system for providing an option to auto-generate a thread on a web forum in response to a change in topic. System 100 includes server 108 and client 112, which may be in communication through network connection 110. The network connection 110 can convey data between the client 112 and the server 108, and can be any suitable wired or wireless connection. In one embodiment, the server 108 can include monitoring application 104 and web site 102.

The client 112 can be used by a user to interact with the web site 102, and the interactions may take place using an internet browser on the client 112 in an exemplary embodiment. In an exemplary embodiment, the client 112 can be configured to allow a user to post messages in a web forum 106 contained within the web site 102.

The monitoring application 104 can monitor the posts received on the web forum 106 to determine if the topic of a received post differs from the topic of the thread in which the post is located. If the topic of the received post is different from the topic of the thread, then the monitoring application 104 may provide a query to the user that submitted the post with an option to auto-generate a new thread for the post or move the post to a relevant second thread on the web forum 106, as described below. A query may refer to a message displayed to the user prompting the user to select from one or more actions.

Figure 2:
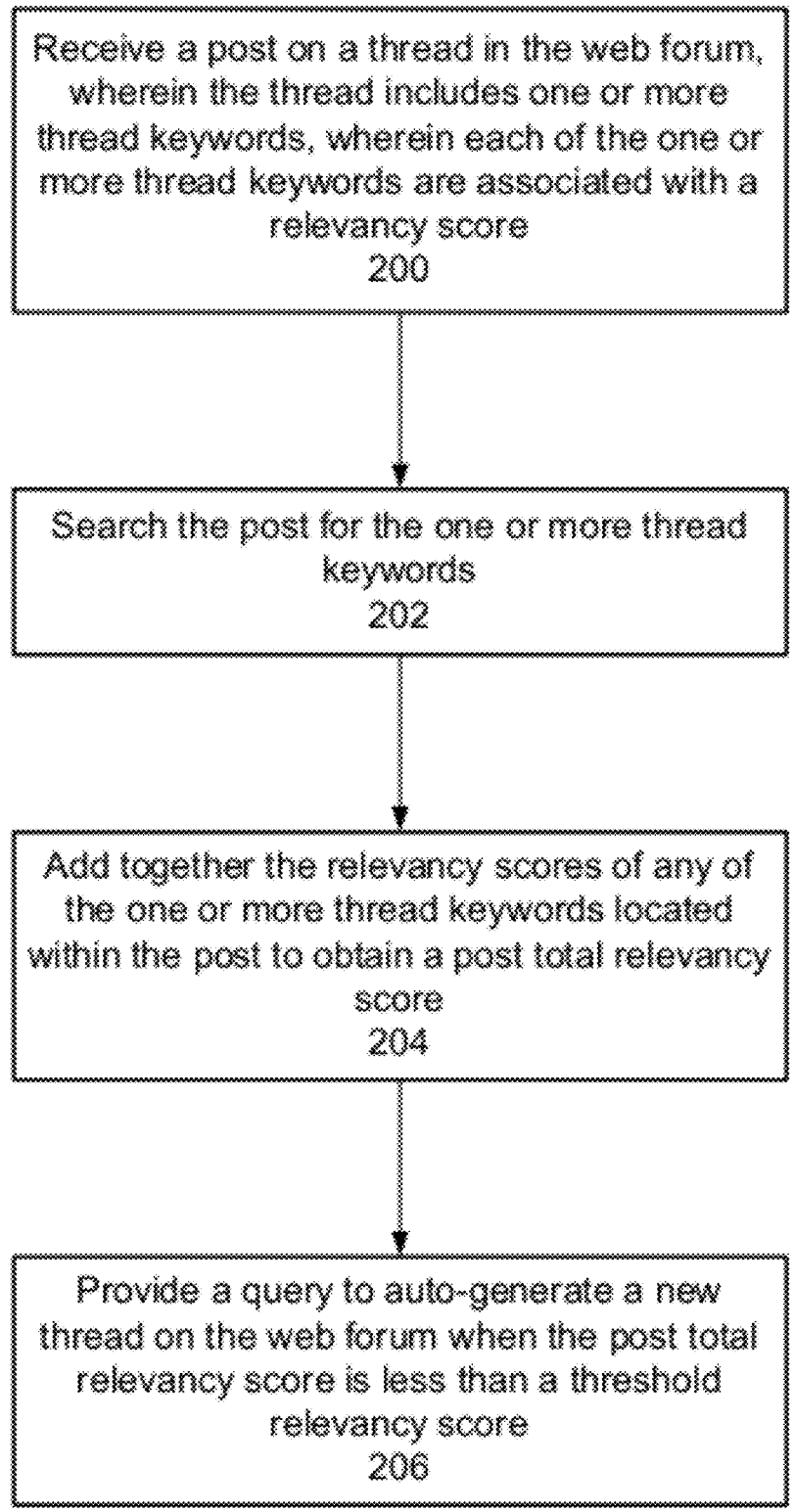
FIG. 2 illustrates an exemplary embodiment of a process for providing an option to auto-generate a thread on a web forum in response to a change in topic.

The monitoring application 104 may be an application that performs the methods described in FIGS. 2 and/or 3. The monitoring application 104 may be implemented in any suitable servlet or applet, and may be executed on the server 108, or on the client 112 in an exemplary embodiment. A listener or observer object, or similar suitable application, or a dynamic web page format, such as Java® Server Pages or Microsoft® Active Server Pages, may be used to implement the monitoring application 104 in an exemplary applet or servlet embodiment. Furthermore, in an exemplary applet embodiment, the monitoring application 104 may exist on the client 112 and receive a list of the existing threads on the web forum 106 from the server 108 (e.g., for subsequent determinations whether or not there are second threads on the web forum 106 to which the post may be moved). The monitoring application 104 can be advantageously implemented on existing web forums and web content substantially without modifying the underlying web code in an exemplary embodiment.

FIG. 2 illustrates an exemplary embodiment of a process for providing an option to auto-generate a thread on a web forum in response to a change in topic. The process depicted in FIG. 2 can be implemented on a server, such as server 108, by using the monitoring application 104, in an exemplary embodiment. A post is received on a thread in the web forum 106 (block 200). The thread includes one or more thread keywords, and each of the one or more thread keywords are associated with a relevancy score.

The one or more thread keywords are words and/or phrases that relate to the topic or topics that a thread creator discusses in his or her original post ("OP"), which is the first post in the thread. In an exemplary embodiment, the one or more thread keywords are identified by a thread creator and/or a forum moderator. The thread creator may identify the thread keywords, for example, by tagging the thread keywords or inserting the thread keywords into a list. In another embodiment, where the thread includes one or more existing posts, the one or more thread keywords may be automatically identified from the one or more existing posts. For example, the one or more thread keywords and the one or more relevancy scores may be automatically identified based upon a keyword frequency and/or a keyword proximity to an original post. Keyword frequency may refer to the frequency a keyword appears in the OP, or in the OP and a predetermined number of posts that immediately follow the OP. The predetermined number of posts can be set to be a fixed number of posts, a percentage of the total number of posts in the thread, or by any other suitable method. Keyword proximity to the OP refers to where in the thread the keyword appears relative to the OP. In an exemplary embodiment, for example, terms that appear in the title of the OP and/or appear multiple times in the body of the OP and posts that are proximate to the OP may be automatically identified as thread keywords.

As stated above, each of the one or more thread keywords are associated with a relevancy score. The relevancy scores are numerical weights used for determination whether or not a post is relevant to the OP or is off-topic instead. The one or more relevancy scores may be assigned by the thread creator and/or the forum moderator in an exemplary embodiment (e.g., the assigning may be done when the thread keywords are identified). In another exemplary embodiment, the one or more relevancy scores may be automatically determined based upon keyword frequency and/or keyword proximity to an original post, as defined above. For example, thread keywords that appear more frequently and/or that are located in the title of the OP or in the posts that are chronologically closer (i.e., are more proximate to the OP) to the OP receive greater weight (i.e., a larger relevancy score) than thread keywords that occur with less frequency and/or are located chronologically further away from the OP. In an exemplary embodiment, the keyword weights may be initially provided by the thread creator and/or the forum moderator, and may be adjusted automatically using the above techniques.

In an exemplary embodiment, a predetermined percentage of the total posts in the thread are examined, and a use count is performed to determine the thread keywords and the relevancy scores for each keyword. The predetermined percentage may be customized by the forum moderator. For example, in technical forums, where thread topic drift is less common, the predetermined percentage may be higher than in a social forum, where topic drift is more common.

After thread keywords for the thread are identified, the post is searched for the one or more thread keywords (block 202), and the relevancy scores of any of the one or more thread keywords located within the post may be added together to obtain a post total relevancy score (block 204). The post total relevancy score may be a numerical representation expressing the weighted number of thread keywords within the post, and may signify the relevance of the post to the thread topic. In an exemplary embodiment, the keywords of the post are automatically identified using a use count. The search for one or more thread keywords may then be implemented on the keywords of the post, instead of the entire text of the post, which may increase the speed and reduce the resources required for the search. Furthermore, the moderator may customize the search parameters of the thread keyword searching, including commencing the search only after a predetermined number of posts have been made in the thread, and requiring a minimum word limit before performing a search, to further optimize the search for the one or more thread keywords.

A query to auto-generate a new thread on the web forum is provided when the post total relevancy score is less than a threshold relevancy score (block 206). The threshold relevancy score may be a numerical representation of the relevance level required to be included in the thread, and may be set either by the thread creator, the forum moderator, automatically (e.g., based upon a summing of the relevancy scores of one or more thread keywords, or another mathematical derivation based upon the relevancy scores of the one or more thread keywords), or by any combination thereof. When the post total relevancy score is less than the threshold relevancy score, there is an increased possibility that the post is "off-topic." The query to auto-generate a new thread on the web forum is provided, for example, to the user that provided the post. The query may be a visual prompt that provides the option to auto-generate a new thread on the web forum, which may be accepted or declined by the user that provided the post in the exemplary embodiment. By providing the option to auto-generate a new thread, instead of merely allowing the user to make a post that may be off-topic, thread clutter may be avoided and the web forum may enjoy superior and more specific organization.

Figure 3:
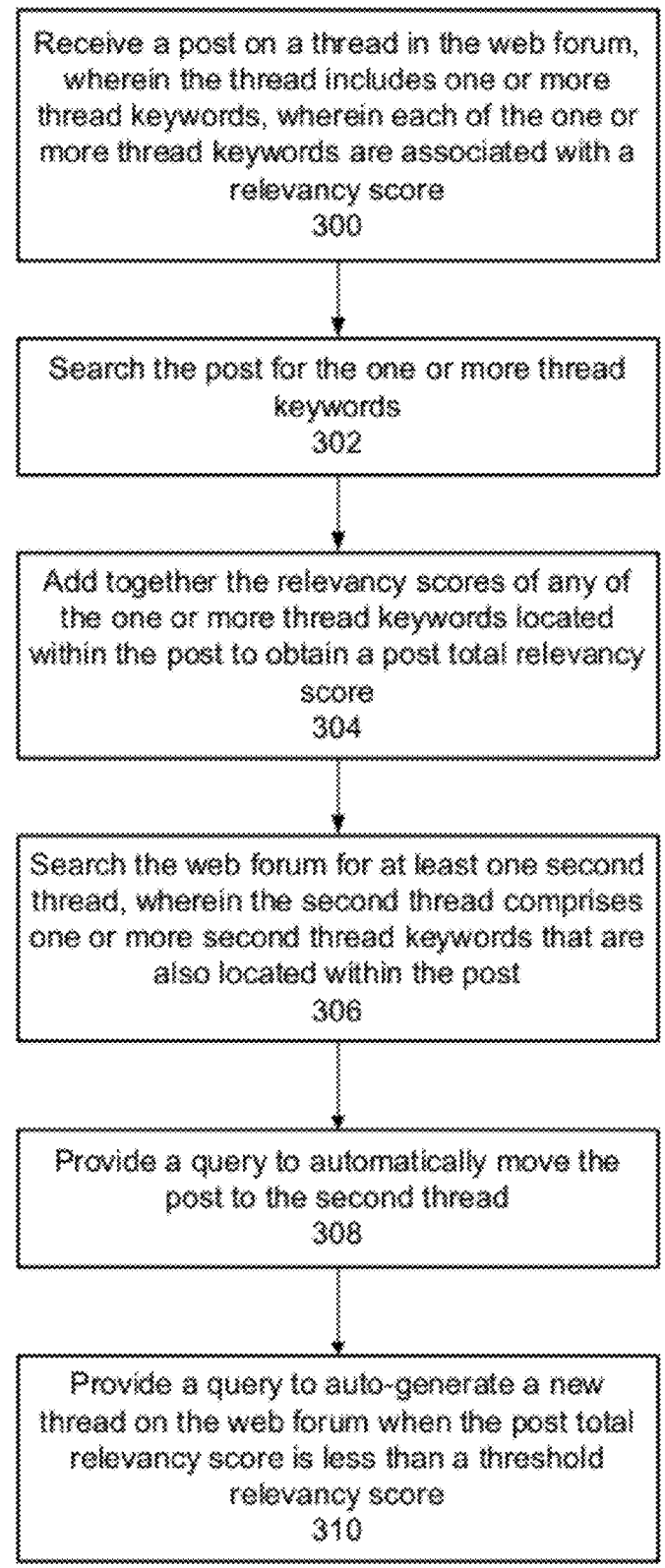
FIG. 3 illustrates an exemplary embodiment of a process for providing an option to automatically move a post from an original thread to a second thread in the web forum.

FIG. 3 illustrates an exemplary embodiment of a process for providing an option to automatically move a post from an original thread to a second thread in a web forum. The process depicted in FIG. 3 can be implemented on the server 108 by the monitoring application 104 in an exemplary embodiment. A post is received on a thread in the web forum 106 (block 300). The thread includes one or more thread keywords, and each of the one or more thread keywords are associated with a relevancy score, as described above. Also, as described above, the post is searched for the one or more thread keywords (block 302), and the relevancy scores of any of the one or more thread keywords located within the post may be added together to obtain a post total relevancy score (block 304).

The web forum may also be searched for at least one second thread, wherein the second thread comprises one or more second thread keywords that are also located within the post (block 306). In an exemplary embodiment, the web forum may be searched when the post total relevancy score is less than the threshold relevancy score. A move query to automatically move the post to the second thread may then be provided (block 308). In one embodiment, a move query may comprise a message displayed to the user prompting the user to move the post to another thread.

In an exemplary embodiment, each of the one or more second thread keywords may be associated with a second thread relevancy score, similarly to the thread in which the post was originally received. Furthermore, the second thread relevancy scores of any of the one or more second thread keywords located within the post may be added together to obtain a post second thread total relevancy score. This may be done, for example, when the post total relevancy score is less than a threshold relevancy score in an exemplary embodiment. A move query may then be provided to automatically move the post to the at least one second thread when the second thread is located and when the post second thread total relevancy score is greater than a second thread threshold relevancy score. Such an embodiment may be advantageous because fewer second threads may be supplied in the move query, thereby providing the user with the most relevant second threads to select from If there are a plurality of second threads that meet the above criteria, then a query may be provided that permits the user to select which of the second threads the user desires to move the post into, if any. The second threads may be presented in a ranked list, with second thread total relevancy scores for each second thread in an exemplary embodiment. The user thereby may be further assisted in placing his or her post into the thread that is topically most relevant to the user, which may improve forum organization and reduce forum clutter.

Also, a query to auto-generate a new thread on the web forum may be provided when the post total relevancy score is less than a threshold relevancy score (block 310), as described above. In an exemplary embodiment, the move query and the query to auto-generate a new thread on the web forum may be provided at the same time (e.g., in the same dialog box). In other embodiments, the move query and the query to auto-generate a new thread on the web forum may be provided at different times.

The above exemplary embodiments discuss the context of a web forum, the present invention is not limited in this regard, and may be used in any text-based website where there are contributions by multiple users, including blogs, wikis, and/or any other suitable medium. An option may be provided to auto-generate parent-level content on the text-based social website in response to a change in topic. In the wiki context, for example, the parent-level content may include a web page discussing broad subject matter (e.g., a car racing season), which may contain links to web articles discussing more specific subject matter, which would be the child-level content (e.g., specific races that occurred during the car racing season).

Child content may be received on the parent in the text-based social website. The parent includes one or more parent keywords, and each of the one or more parent keywords are associated with a relevancy score, as described above. The child content may be searched for the one or more parent keywords, and the relevancy scores of any of the one or more parent keywords located within the child content may be added together to obtain a child total relevancy score, again, as described above. A query to auto-generate new parent-content on the text-based social website may be provided when the child total relevancy score is less than a threshold relevancy score. In the car racing season wiki example described, when an article about a specific race car driver is received on the car racing season wiki page and the race car driver page total relevancy score is less than the threshold relevancy score (i.e., it is off-topic), then the user submitting the link may receive a query providing the option to auto-generate a new wiki page, instead of potentially cluttering the car racing season wiki page. As a result, other text-based websites may similarly benefit from reduced clutter and improved organization as the embodiments described above.

Figure 4:
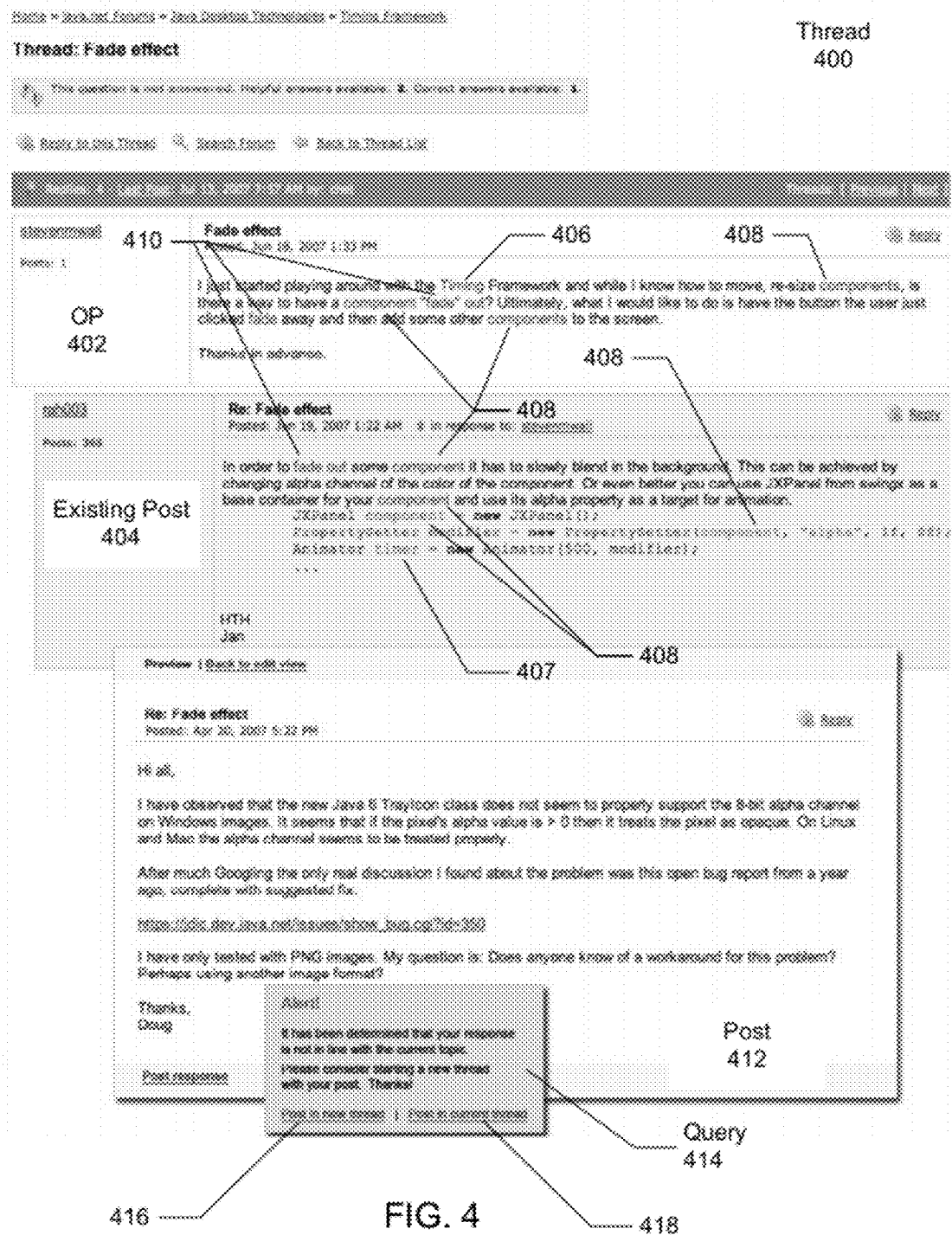
FIG. 4 illustrates an exemplary embodiment of a web forum thread on a display where a user is queried to move a post to an auto-generated thread on the web forum in response to a change in topic.

FIG. 4 illustrates an exemplary embodiment of a web forum thread on a display where a user is queried to move a post to an auto-generated thread on the web forum 106 when a change in topic is detected. Exemplary thread 400 is shown, entitled "Fade effect," which may include the OP 402 and existing post 404. The OP 402 and the existing post 404 include thread keywords 406, 407, 408, and 410, which are the strings "timing," "timer," "component," and "fade" respectively. Each thread keyword is associated with a relevancy score, which may have been assigned by a thread creator to be a score of three for keywords 406 and 407, one for keyword 408, and five for keyword 410, for example.

Post 412 has been received, and does not contain any of the thread keywords, therefore yielding a post total relevancy score of zero. The thread creator may have also assigned the threshold relevancy score for the thread, which may be ten, for example. Because the post total relevancy score, zero in this example, for the post 412, is less than the threshold relevancy score of ten, query 414 has been provided, which provides the option to auto-generate a new thread on the web forum with new thread link 416. The user that submitted the post 412 may alternatively add the post 412 to the thread 400 by selecting current thread link 418.

Figure 5:
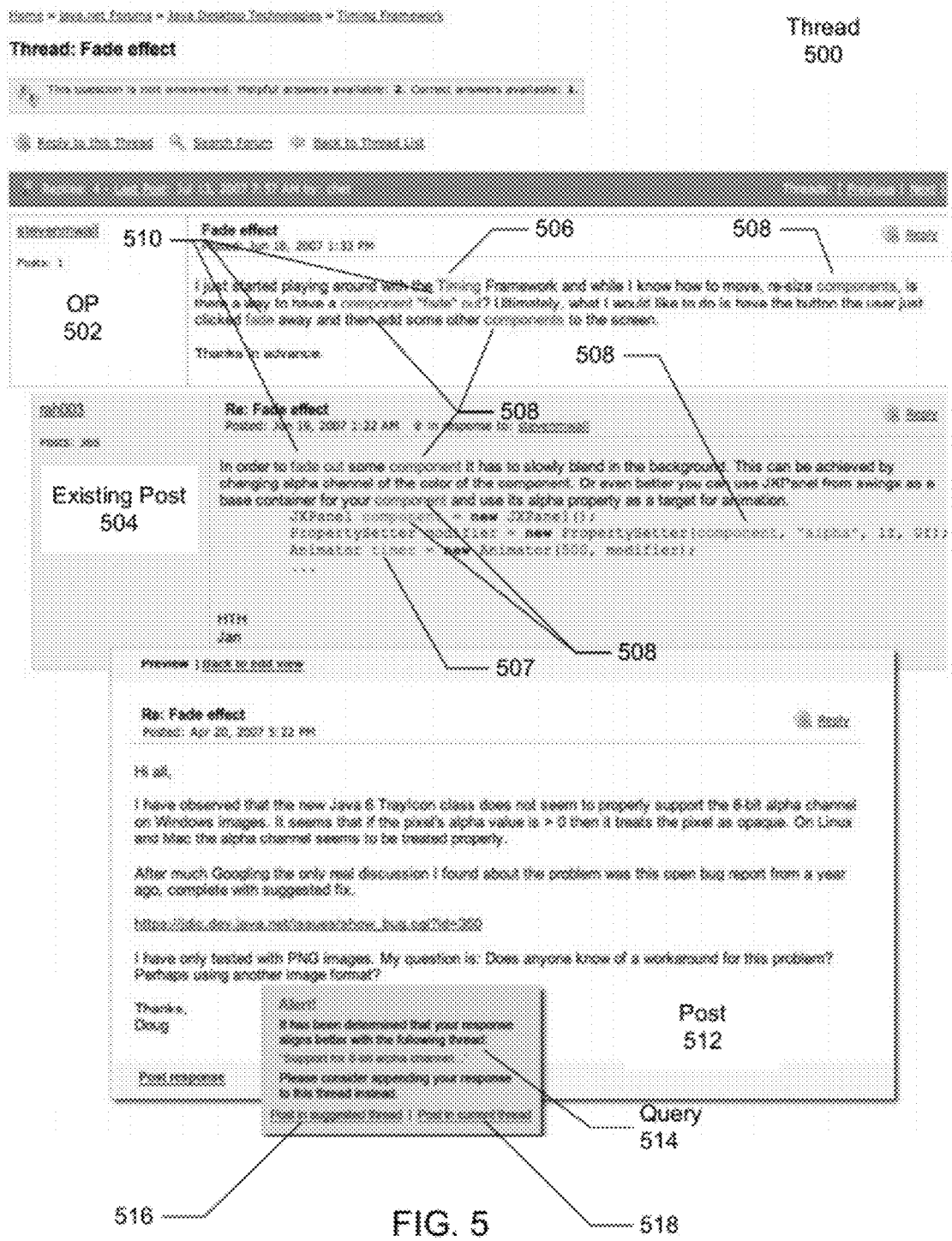
FIG. 5 illustrates an exemplary embodiment of a web forum thread on a display where a user is queried to move a post to a second thread on the web forum in response to a change in topic.

FIG. 5 illustrates an exemplary embodiment of a web forum thread on a display where a user is queried to move a post to a second thread on the web forum in response to a change in topic. As in FIG. 4, exemplary thread 500, entitled "Fade effect," is shown, which may include the OP 502 and existing post 504. The OP 502 and the existing post 504 include thread keywords 506, 507, 508, and 510, which are the strings "timing," "timer," "component," and "fade" respectively. Each thread keyword is associated with a relevancy score, which may have been assigned by a thread creator to be a score of three for keywords 506 and 507, one for keyword 508, and five for keyword 510, for example.

Post 512 has been received, and does not contain any of the thread keywords, therefore yielding a post total relevancy score of zero. The thread creator may have also assigned the threshold relevancy score for the thread, which may be ten, for example. Because the post total relevancy score, zero in this example, for the post 512, is less than the threshold relevancy score of ten, the web forum 106 has been searched for at least one second thread. The second thread includes one or more second thread keywords that are also located within the post 512. A second thread has been located, entitled "Support for 8-bit alpha channel . . . ," because the post 512 also includes second thread keyword "alpha." A query 514 has been provided, which provides the option to automatically move the post 512 to the second thread 513 using change thread link 516. The user that submitted the post 512 may alternatively add the post 512 to the thread 500 by selecting current thread link 518.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

A method and system for providing an option to auto-generate a thread on a web forum in response to a change in topic has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for managing a thread on a web forum in response to a change in topic, comprising:
   receiving a post on a thread in a web forum within a data processing system having at least one processor, wherein the thread includes one or more thread keywords, wherein each of the one or more thread keywords are associated with a relevancy score;
   searching the post for the one or more thread keywords;
   adding together the relevancy scores of any of the one or more thread keywords located within the post to obtain a post total relevancy score;
   in response to a determination that the post total relevancy score is less than the threshold relevancy score, searching the web forum for at least one existing second thread, wherein the existing second thread comprises one or more second thread keywords that are also located within the post; and
   providing a move query to automatically move the post to the existing second thread.

2. The method of claim 1 wherein the thread comprises one or more existing posts, wherein the one or more thread keywords are automatically identified from the one or more existing posts.

3. The method of claim 2 wherein the one or more thread keywords and the one or more relevancy scores are automatically identified based upon at least one of a keyword frequency and a keyword proximity to an original post.

4. The method of claim 1 wherein the one or more thread keywords are identified by at least one of a thread creator and a forum moderator.

5. The method of claim 4 wherein the one or more relevancy scores are automatically determined based upon at least one of a keyword frequency and a keyword proximity to an original post.

6. The method of claim 4 wherein the one or more relevancy scores are assigned by at least one of the thread creator and the forum moderator.

7. The method of claim 1 further comprising:
   associating each of the one or more second thread keywords with a second thread relevancy score;
   adding together the second thread relevancy scores of any of the one or more second thread keywords located within the post to obtain a post second thread total relevancy score; and
   providing the move query to automatically move the post to the existing second thread in response to a determination that the post second thread total relevancy score is greater than a second thread threshold relevancy score.

8. A system for managing a thread on a web forum in response to a change in topic, comprising:
   at least one server, wherein the server comprises at least one web site, wherein the at least one web site comprises:
   a web forum; and
   a monitoring application, wherein the monitoring application is configured to:
      receive a post on a thread in the web forum, wherein the thread includes one or more thread keywords, wherein each of the one or more thread keywords are associated with a relevancy score;
      search the post for the one or more thread keywords;
      add together the relevancy scores of any of the one or more thread keywords located within the post to obtain a post total relevancy score;
      in response to a determination that the post total relevancy score is less than the threshold relevancy score, search the web forum for at least one existing second thread, wherein the existing second thread comprises one or more second thread keywords that are also located within the post; and providing a move query to automatically move the post to the existing second thread.

9. The system of claim 8 wherein the thread comprises one or more existing posts, wherein the monitoring application is further configured to automatically identify one or more thread keywords from the one or more existing posts.

10. The system of claim 9 wherein the one or more thread keywords and the one or more relevancy scores are automatically identified based upon at least one of a keyword frequency and a keyword proximity to an original post.

11. The system of claim 8 wherein the one or more thread keywords are identified by at least one of a thread creator and a forum moderator.

12. The system of claim 11 wherein the monitoring application is further configured to automatically determine the one or more relevancy scores based upon at least one of a keyword frequency and a keyword proximity to an original post.

13. The system of claim 11 wherein the one or more relevancy scores are assigned by at least one of the thread creator and the forum moderator.

14. The system of claim 8 wherein the monitoring application is further configured to:
associate each of the one or more second thread keywords with a second thread relevancy score;
add together the second thread relevancy scores of any of the one or more second thread keywords located within the post to obtain a post second thread total relevancy score; and
provide the move query to automatically move the post to the existing second thread in response to a determination that the post second thread total relevancy score is greater than a second thread threshold relevancy score.

15. A program product stored on a computer-readable medium containing program instructions for managing a thread on a web forum in response to a change in topic, the program instructions for:
receiving a post on a thread in a web forum within a data processing system having at least one processor, wherein the thread includes one or more thread keywords, wherein each of the one or more thread keywords are associated with a relevancy score;
searching the post for the one or more thread keywords;
adding together the relevancy scores of any of the one or more thread keywords located within the post to obtain a post total relevancy score;
in response to a determination that the post total relevancy score is less than the threshold relevancy score, searching the web forum for at least one existing second thread, wherein the existing second thread comprises one or more second thread keywords that are also located within the post; and
providing a move query to automatically move the post to the existing second thread.

16. The program product of claim 15 wherein the thread comprises one or more existing posts, wherein the program product further comprises program instructions to automatically identify the one or more thread keywords from the one or more existing posts.

17. The program product of claim 16 wherein the program product further comprises program instructions to automatically identify the one or more thread keywords and the one or more relevancy scores based upon at least one of a keyword frequency and a keyword proximity to an original post.

18. The program product of claim 15 wherein the one or more thread keywords are identified by at least one of a thread creator and a forum moderator.

19. The program product of claim 18 wherein the program product further comprises program instructions to automatically determine the one or more relevancy scores based upon at least one of a keyword frequency and a keyword proximity to an original post.

20. The program product of claim 18 wherein the one or more relevancy scores are assigned by at least one of the thread creator and the forum moderator.

21. The program product of claim 15 further comprising program instructions for:
associating each of the one or more second thread keywords with a second thread relevancy score;
adding together the second thread relevancy scores of any of the one or more second thread keywords located within the post to obtain a post second thread total relevancy score; and
providing the move query to automatically move the post to the existing second thread in response to a determination that the post second thread total relevancy score is greater than a second thread threshold relevancy score.

* * * * *